Aug. 22, 1944.   H. TAILLEFERRE   2,356,546
MARINE POWER PLANT
Filed June 19, 1939
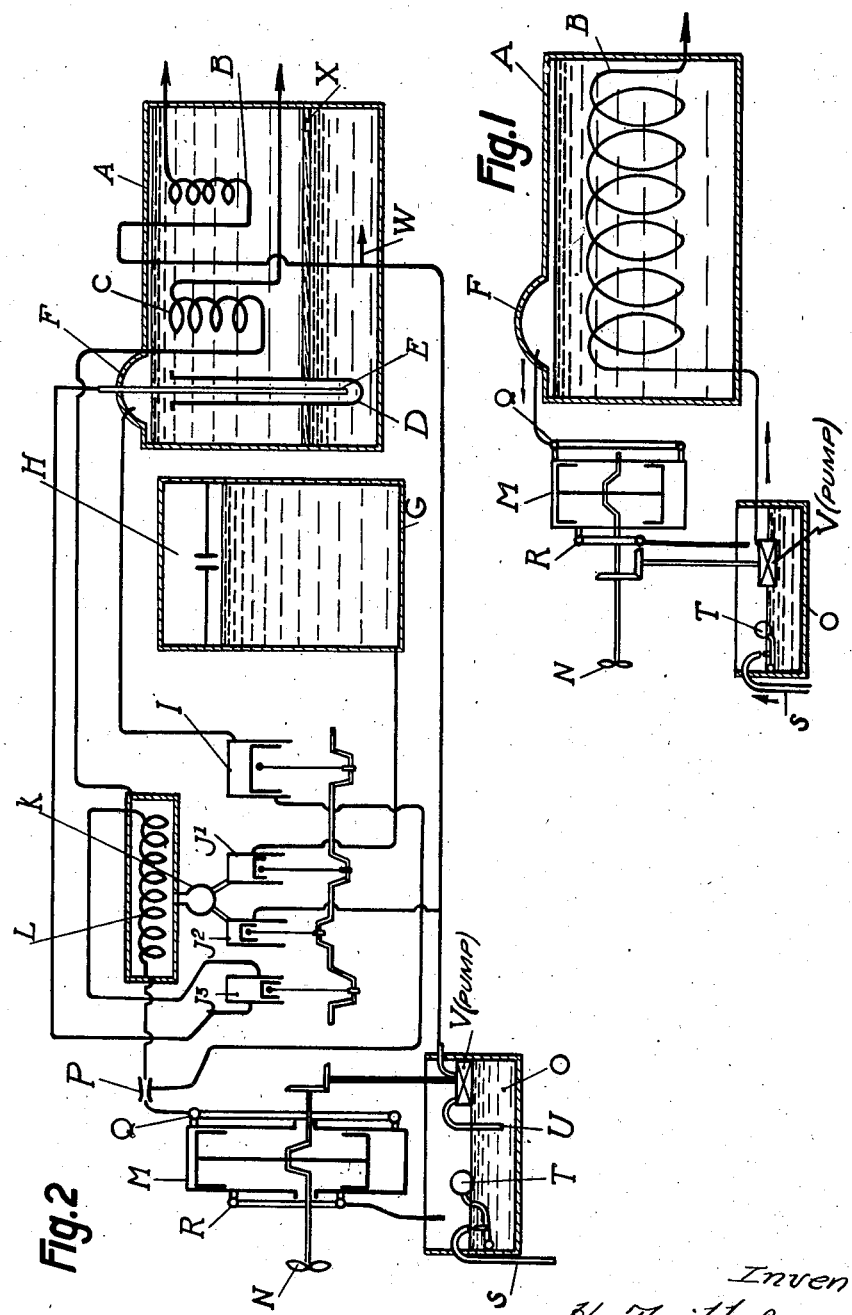
Inventor
H. Tailleferre
By Glascock Downing & Seebold
Attys.

Patented Aug. 22, 1944

2,356,546

UNITED STATES PATENT OFFICE 2,356,546

MARINE POWER PLANT

Henri Tailleferre, Paris, France; vested in the Alien Property Custodian

Application June 19, 1939, Serial No. 280,012
In Great Britain July 5, 1938

3 Claims. (Cl. 60—37)

This invention has for its object a power plant which is intended in particular for propelling submerged machines such as submarines, torpedoes and submarine mines for example, in such a manner that nothing can reveal their presence.

Such a plant is mainly characterized by the fact that, for actuating the engine or engines which drive the propeller or propellers of the immersed machine, a liquefied or optionally a solidified gas is used, which is automatically raised to its utilisation temperature by one or a plurality of exothermic chemical reactions participated in by the liquid wherein the machine circulates or performs evolutions, the gas which is utilized and also the agents which react together being furthermore such that the gaseous exhaust products of the engine or engines and likewise the products to be educed from the reaction or reactions are soluble in the liquid wherein the driver machine operates.

As a result of the use of these liquefied gases and of the phenomena which ensue therefrom, the reserve of power that is stored up is considerably increased.

Thus, by way of example, an ordinary torpedo which has a reserve of 400 litres of air at 200 kg. per sq. cm. raised to the utilization temperature, viz. 500° C., has available about 224 cubic metres of gas brought down to atmospheric pressure, whereas the same machine equipped with the devices of this invention would have available a reserve of about 1,120 cubic metres. Furthermore, the storage vessels, instead of being subjected to a pressure of 200 kg. per sq. cm. would only be subjected to a pressure of about 30 kg. per sq. cm. This is a great advantage, since the saving of weight effected on the storage vessels can be used, either to increase the reserve of power, which also corresponds to an increase of range, or to increase the weight of the explosive charge.

It follows from the above figures that, under the present conditions, the range is multiplied by five, that is to say, that for a normal torpedo of 550 mm. diameter, which has a range of about twelve kilometres, the range will be about sixty kilometres when said torpedo is equipped according to the invention.

Several embodiments of power plant according to the invention, and also of powered machines involving the application of same, are described hereinafter and diagrammatically illustrated in the accompanying drawing in which:

Fig. 1 shows a power plant in one of the simplest embodiments; and

Fig. 2 shows a more complex embodiment.

Referring to the power plant shown in Fig. 1, A is a reservoir containing, for example, liquefied ammonia gas and provided with a heating coil B; F is a dome located at the upper part of the reservoir A for the take-off of the gaseous ammonia; M is an engine on the shaft of which is fixed the propeller N of the powered machine; O is a tank, hereinafter called absorber-heater.

The plant operates as follows:

The ammonia gas flows from the dome F to the inlet Q of the engine M and so actuates said engine, the exhaust gases of which flow from the exhaust pipe R into the absorber-heater O. Into this tank is introduced, through a pipe S which is controlled by a float valve T, the liquid in which the machine operates, for example, sea-water. The solution of the ammonia gas in the water evolves heat and the hot ammoniacal water is driven, by a pump V actuated by the engine M, into the coil B and heats the liquid ammonia in the reservoir A; the ammoniacal water is then exhausted through the pipe into the sea.

By means of this self-heating, the working temperature is very quickly reached.

In this operation, the sole elements involved are therefore, on the one hand, the gas used for actuating the engine, and on the other hand, the liquid, for example the sea-water, in which the machine equipped with the plant in question circulates or performs evolutions.

In the embodiment of Fig. 2, in addition to the liquefied gas and the ambient liquid, another reacting agent is involved, in this case and for example, concentrated sulphuric anhydride or oleum.

In this figure, A is the reservoir containing liquefied ammonia gas and provided with heating coils B and C; D is a tube arranged in the reservoir in such a manner as to enable the liquid ammonia to be taken up by a pipe E dipping into the tube D. F is the dome which is located at the upper part of the reservoir A and serves for the take-off of the gaseous ammonia.

G is a reservoir of sulphuric anhydride (oleum), the upper part H of which forms an air chamber. I is an auxiliary piston engine, $J^1$, $J^2$, $J^3$ are three piston pumps actuated by the auxiliary engine I. K is a mixer connected to the pumps $J^1$, $J^2$. L is a superheater, M is the main engine, on the shaft of which is fixed the propeller N of the powered machine. O is the absorber-heater.

The operation is as follows:

The ammonia gas taken off at the dome F is conveyed to the auxiliary engine I which is set in motion and in turn actuates the three pumps $J^1$, $J^2$, $J^3$. The pump $J^1$ sucks sulphuric anhydride taken from the reservoir G and drives it into the mixer K into which, on the other hand, the pump $J^2$ delivers water obtained from the absorber-heater reservoir O.

The two liquids intermingle and produce an exothermic reaction, thereby enabling the liquid ammonia drawn into the tube E by the pump $J^3$ to be superheated in the superheater L. The ammonia issuing from the superheater L flows into a nozzle P of the Venturi type connected to the exhaust of the auxiliary engine I which causes a depression in the exhaust of the engine. The ammonia flows thence to the inlet Q of the main engine M which it actuates. The exhaust R of the engine M exhausts its gases into the absorber-heater O which is provided with a water inlet S controlled by a float valve T and with an outlet U for the heated ammoniacal water provided with a pump V. The ammonia dissolves in the water in the tank O and evolves heat; the hot ammoniacal water is pumped by the pump $J^2$ so that in the mixer K it is converted into a solution of ammonium sulphate by exothermic reaction with the oleum.

In order not to modify the ballistic coefficient or buoyancy of the machine, a quantity of liquid is introduced at the base of the reservoir A, equal in volume to that of the liquid ammonia used.

A portion of the ammoniacal water issuing from the absorber-heater O is used as substitution water at the lower part of the reservoir A wherein it is introduced through the tube W. The ammoniacal substitution water is separated from the ammonia in the reservoir A by an oil piston X or by any other means.

The excess of hot ammoniacal water is used, by passing it through the coil B, for heating the liquid ammonia stored in the reservoir A; said excess is then exhausted into the ambient medium.

Furthermore, after being used in the superheater L, the hot solution of ammonium sulphate is also used for heating the ammonia in the same tank A by circulating said solution in a coil C whence it is exhausted into the ambient medium.

It is, of course, understood that the invention is in no way limited to particular embodiments, and that without exceeding the scope of the invention, numerous modifications and improvements of detail can be conceived, as well as the use of means forming equivalents of those given by way of example.

I claim:

1. A power plant adapted to propel a floating device on a body of water comprising in combination a reservoir for holding a material which at ordinary temperatures and pressures is a gas readily soluble in water with the evolution of heat, said material being maintained under sufficient pressure to hold it in the liquid state, means for heating said material to volatilize it, a gas engine adapted to drive a propulsion means for said floating device and provided with an intake and exhaust, means for passing the volatilized material under pressure into the intake of said engine, a gas absorbing vessel, means for passing the exhaust gas from said engine into said absorbing vessel, means for passing water from said body of water into said absorbing vessel whereby heat is generated from the solution of said gas in the water, and means for passing the resulting hot solution through said means for heating said material and thence into said body of water, wherein said reservoir is filled with liquid ammonia and wherein a mixing vessel is provided for mixing the solution formed in said absorbing vessel with a material, selected from a class consisting of oleum and sulfuric haust gas, whereby a hot solution of ammonium sulfate is formed, and means for passing the said hot solution in heat conducting relationship with said reservoir.

2. The power plant of claim 1 wherein means are provided to admit said hot solution into the lower portion of said reservoir to displace the liquid in said reservoir as the latter is used up during operation of said power plant.

3. A power plant comprising in combination a reservoir for holding liquid ammonia, means for heating said liquid ammonia to volatilize the same, an auxiliary gas engine having an intake and an exhaust, means for passing the volatilized ammonia into the intake of said auxiliary engine, a main gas engine having an intake and an exhaust, means for passing the exhaust gas from said auxiliary engine to the intake of said main engine, an absorption vessel, means for passing the exhaust gas from said main engine into said absorption vessel, means for passing water into said absorption vessel in contact with said exhaust gas, whereby a hot solution of ammonium hydroxide is produced, means for passing a portion of said hot solution through said means for heating said liquid ammonia, a reservoir for holding sulfuric anhydride, a superheater, means for passing said sulfuric anhydride into said superheater, means for passing a second portion of said hot solution into said superheater in contact with said sulfuric anhydride, whereby a hot solution of ammonium sulfate is produced, means for passing ammonia from said first named reservoir in heat conducting relationship with the hot solution of ammonium sulfate in said superheater and then into the intake of said main engine, and means for passing said hot solution of ammonium sulfate from said superheater in heat conducting relationship with the liquid ammonia in said first named reservoir.

HENRI TAILLEFERRE.